United States Patent [19]

Hirota

[11] Patent Number: 5,317,408
[45] Date of Patent: May 31, 1994

[54] HORIZONTALLY ALIGNED IMAGE PICKUP FOR CCD IMAGE SENSOR

[75] Inventor: Isao Hirota, Kanagawa, Japan

[73] Assignee: Sony Corporation, Tokyo, Japan

[21] Appl. No.: 842,609

[22] Filed: Feb. 27, 1992

[30] Foreign Application Priority Data

Feb. 27, 1991 [JP] Japan ................... 3-032989

[51] Int. Cl.⁵ ................. H04N 3/14; H04N 5/335
[52] U.S. Cl. ........................................... 348/315
[58] Field of Search ............. 358/213.23, 213.29, 358/213.26, 213.28, 44, 213.11; H04N 5/335

[56] References Cited

U.S. PATENT DOCUMENTS

| | | | |
|---|---|---|---|
| 4,641,183 | 2/1987 | Kinoshita | 358/213.29 |
| 4,837,630 | 6/1989 | Ueda | 358/213.26 |
| 4,878,121 | 10/1989 | Hynecek | 358/213.26 |
| 5,182,648 | 1/1993 | Hirota | 358/213.23 |

FOREIGN PATENT DOCUMENTS

| | | | |
|---|---|---|---|
| 61-198981 | 9/1986 | Japan | H04N 5/335 |
| 3102984 | 4/1991 | Japan | H04N 5/335 |
| 3120976 | 5/1991 | Japan | H04N 5/335 |

*Primary Examiner*—Joseph Mancuso
*Assistant Examiner*—Wendy R. Greening
*Attorney, Agent, or Firm*—Hill, Steadman & Simpson

[57] ABSTRACT

A charge coupled device image sensor is comprised of an imaging section including a plurality of photoelectric converting sections arrayed in a matrix configuration for generating signal charges and a plurality of horizontal shift registers arranged between the horizontal rows of the photoelectric converting sections for transferring the signal charges via a readout section in the horizontal direction, a storage section having a plurality of horizontal shift registers for transferring the signal charges in the horizontal direction and in the vertical direction line by line, a readout section coupled to the storage section and including a plurality of horizontal shift registers for reading out signal charges from the storage section, and a serial-to-parallel converting section provided between the imaging section and the storage section for storing one-line of signal charges from the imaging section into double-line of image signal.

5 Claims, 8 Drawing Sheets

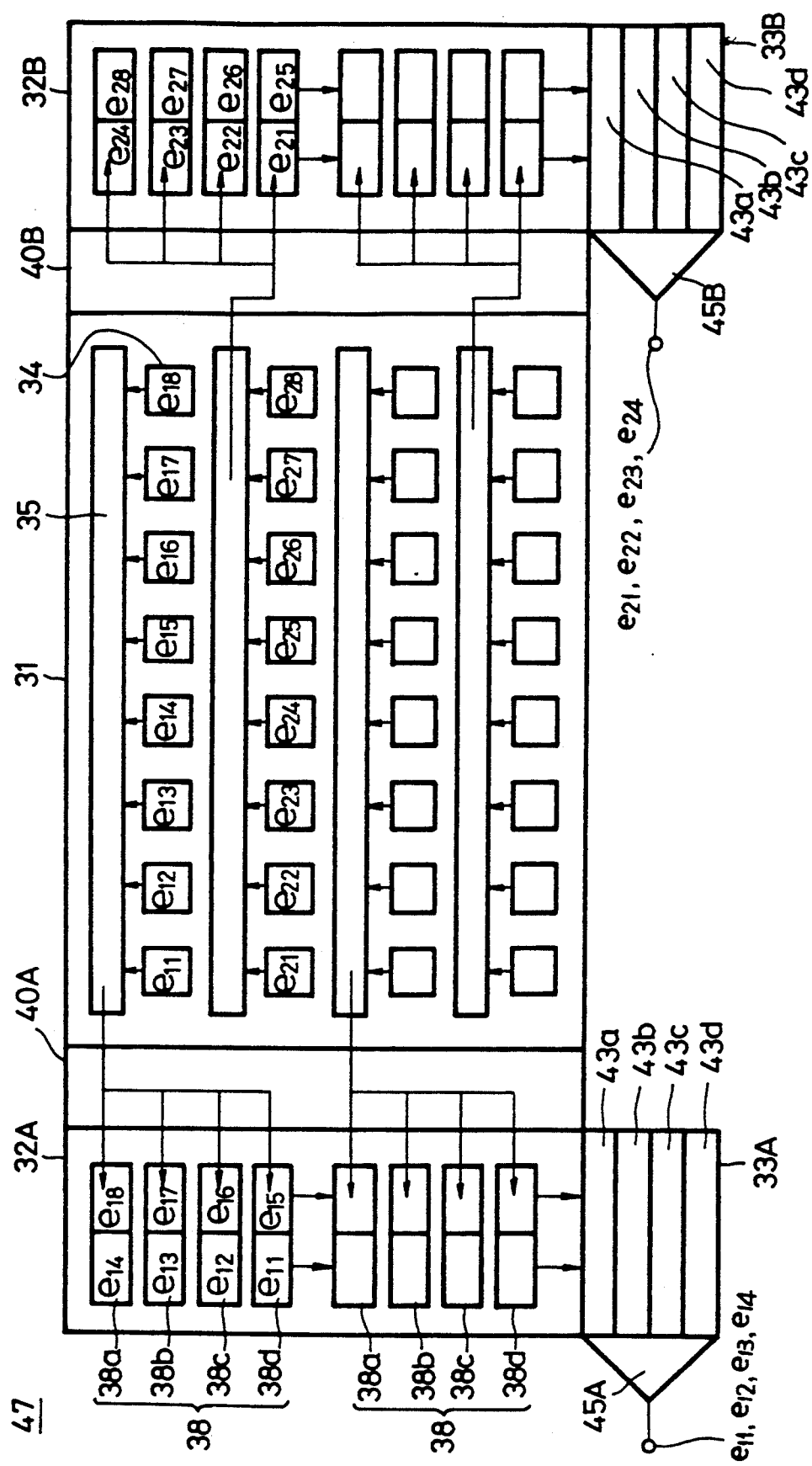

HORIZONTALLY ALIGNED IMAGE PICKUP FOR CCD IMAGE SENSOR

BACKGROUND OF THE INVENTION

1. Field of the Invention

The present invention generally relates to solid state image sensors and, more particularly, to a solid state image sensor or charge coupled device image sensor of an FIT (frame-interline transfer) type.

2. Description of the Prior Art

An example of a vertical FIT type solid state image sensor according to the prior art is shown in FIGS. 1 through 3.

Throughout FIGS. 1 to 3, reference numeral 1 designates an image pickup or imaging section, 2 a storage section, and 3 an output section, that is, a horizontal shift register section of a CCD (charge coupled device) structure, respectively. The imaging section 1 is formed of a number of light receiving elements or photoelectric-converting elements 4 arranged in a matrix fashion and a vertical shift register 5 of a CCD structure for transferring signal charges of the light receiving elements 4 in the vertical direction and located on one side of each of vertically arrayed light receiving elements 4. The storage section 2 is located under the imaging section 1 in the vertical direction and adapted to temporarily store the signal charges generated in the imaging section 1. The storage section 2 is comprised of a plurality of vertical shift registers 6 of CCD structure which correspond to the vertical shift registers 5 of the imaging section 1 in a one-to-one relation (1:1).

Each of the vertical shift registers 5 and 6 in the imaging section 1 and the storage section 2 employs a 4-phase driving system and is controlled, for example, by 4-phase drive pulses $\phi IM_1$, $\phi IM_2$, $\phi IM_3$, $\phi IM_4$ and $\phi ST_1$, $\phi ST_2$, $\phi ST_3$, $\phi ST_4$. As shown in FIG. 2, four transfer sections VR (VR$_1$, VR$_2$, VR$_3$, VR$_4$), each having a transfer electrode are made 1 bit. In the vertical shift register 5 of the imaging section 1, two transfer sections VR$_1$, VR$_2$ and two transfer sections VR$_3$, VR$_4$ correspond to the light receiving elements 4, respectively. Between each of the light receiving elements 4 and the vertical shift register 5, there is provided a read-out gate section (ROG) 7. In FIG. 2, hatched areas 8 represent channel stop regions. The horizontal shift register 3 of the output section employs, for example, a 2-phase drive system in which it is controlled by 2-phase drive pulses $\phi H_1$ and $\phi H_2$. In the horizontal shift register 3, a first storage section st$_1$, a first transfer section tr$_1$, a second storage section st$_2$ and a second transfer section tr$_2$ form one bit and this 1 bit corresponds to one vertical shift register 6 of the storage section 2.

FIG. 3 is a cross-sectional view taken along the line A—A in FIG. 2. In the horizontal shift register 3, on the surface of a P-type silicon substrate 11 formed is an N-type buried channel layer 12, and transfer electrodes 14 are formed through an insulating film 13 on the buried channel layer 12, thus the respective transfer sections, that is, the first storage section st$_1$, the first transfer section tr$_1$, the second storage section st$_2$ and the second transfer section tr$_2$ being formed. The transfer electrodes 14 of first storage section st$_1$ and first transfer section tr$_1$ are connected commonly to a bus line to which the drive pulse $\phi H_1$ is applied, while the transfer electrodes 14 of second storage section st$_2$ and second transfer section tr$_2$ are commonly connected to a bus line to which the drive pulse $\phi H_2$ is applied.

In the vertical type FIT solid state imaging element 15, during the vertical blanking period, the signal charges of the light receiving elements 4 are read out to the vertical shift registers 5 through the read-out gate sections 7, transferred through the vertical shift registers 5 and then temporarily stored in the storage section 2. At every horizontal blanking period, the signal charge at every horizontal line is transferred from the storage section 2 to the horizontal shift register section 3. The signal charge of one horizontal line transferred to the horizontal shift register section 3 is transferred in the horizontal direction in the horizontal shift register section 3 and then outputted.

FIG. 4 shows an example of a horizontal type FIT solid state imaging element 16 (described in Japanese Laid-Open Patent Publication No. 61-125077). This horizontal type FIT imaging element 16 is formed such that the storage section 2 is located at one side of imaging section 1 in the horizontal direction and the horizontal shift register section 3 of the output section is located at the lower side of the storage section 2 in the vertical direction. In the imaging section 1, a number of light receiving elements 4 are arrayed in a matrix configuration and at one side of each row of horizontally-arrayed light receiving elements 4, there is located a horizontal shift register 17 which corresponds to the vertical shift register 5 of the former example. The horizontal shift register 17 can employ a 3-phase drive system which is controlled, for example, by 3-phase drive pulses $\phi IM_1$, $\phi IM_2$ and $\phi IM_3$ shown in FIG. 4. In this case, as shown in FIG. 5, three transfer sections VR (VR$_1$, VR$_2$, VR$_3$), each having a transfer electrode, are made as 1 bit and this 1 bit corresponds to each light receiving element 4. The signal charge from each of the light receiving elements 4 is transferred to the horizontal shift register 17 through the read-out gate section (ROG) 7, transferred in the horizontal direction and then stored in the storage section 2 temporarily.

The storage section 2 comprises a plurality of horizontal shift registers 18 which correspond to the horizontal shift registers 17 in the imaging section 1 at one-to-one relation (1:1). The adjacent horizontal shift registers 18 are coupled through a gate section (transfer channels SR$_5$ controlled by a gate electrode) 19 for transferring the signal charge in the vertical direction as shown in FIG. 5. Each of the horizontal shift registers 18 employs, for example, a 4-phase drive system which is controlled by 4-phase drive pulses $\phi ST_1$, $\phi ST_2$, $\phi ST_3$, $\phi ST_4$ and in which four transfer sections SR (SR$_1$, SR$_2$, SR$_3$, SR$_4$) are made as 1 bit and two transfer sections SR$_2$, SR$_1$ in the upper horizontal shift registers 18 are coupled through the gate section 19 to two transfer sections SR$_4$, SR$_3$ in the adjacent lower horizontal shift register 18. Since the respective transfer sections SR$_1$, SR$_2$, SR$_3$, SR$_4$ of each of the horizontal shift registers 18 are respectively formed in correspondence to one another in the vertical direction, the gate section 19 is formed in a slant direction in order to couple the transfer sections which are displaced each other by a half bit. In the storage section 2, the vertical transfer of the signal charge to the output side thereof (to the horizontal shift register section 3) is carried out in a so-called zigzag fashion in which the charges in the transfer sections SR$_2$, SR$_1$ are transferred to the transfer sections SR$_4$, SR$_3$ by a half bit in the horizontal direction and then transferred to the transfer sections SR$_2$, SR$_1$ of the lower stage of the horizontal shift register 18.

The horizontal shift register section 3 of the output section is formed of two horizontal shift registers, namely, a first horizontal shift register 20 and a second horizontal shift register 21. The first and second horizontal shift registers 20 and 21 are coupled through a gate section (i.e., a transfer channel controlled by a gate electrode) 22. Each of the first and second horizontal shift registers 20 and 21 employ, for example, 2-phase drive system which is controlled by 2-phase drive pulses $\phi$H$_1$ and $\phi$H$_2$. In this case, a first storage section st$_1$, a first transfer section tr$_1$, a second storage section st$_2$ and a second transfer section tr$_2$ form one bit which corresponds to one bit of the horizontal shift register 18 of the storage section 2. The second storage and transfer sections st$_2$ and tr$_2$ of the first horizontal shift register 20 are coupled to the first storage and transfer sections st$_1$ and tr$_1$ of the second horizontal shift register 21 through the gate section 22. In that case, the corresponding storage and transfer sections of the first and second horizontal shift registers 20 and 21 are formed to correspond to one another in the vertical direction so that the gate section 2 is formed to be inclined.

In the horizontal shift register section 3, there is line-transferred the signal charge of the horizontal line from the storage section 2. That is, signal charges of the light receiving elements 4 on, for example, an odd horizontal line are transferred to the first horizontal shift register 20, while the signal charges of the light receiving elements 4 on an even horizontal line are transferred to the second horizontal shift register 21. Then, these signal charges are transferred at the same time in the horizontal direction so that the signal charges of two horizontal lines are outputted simultaneously.

In the horizontal type FIT solid state imaging elements 16, since the horizontal pitch (i.e., one bit distance) of the horizontal shift registers 18 in the storage section 2 does not depends on the light receiving system, the horizontal pitch 16 can be designed freely. Thus, the horizontal pitch of the horizontal shift register section 3 at the output section can be designed with a room. Therefore, even when the imaging section 1 is made high in image density, the horizontal shift registers 20 and 21 of the output section can be formed. Thus, it is possible to make the FIT type solid state imaging element with high image density.

In the vertical type FIT solid state imaging element 15, as shown in FIG. 6, a width W$_1$ of one pixel (one cell) a of the imaging section 1 corresponds to a transfer channel width W$_2$ of the vertical shift register 6 in the storage section 2 and then a horizontal pitch (i.e., length of one bit) X$_1$ of the horizontal shift register section 3 at the output section is determined correspondingly. Therefore, if the number of pixels, particularly the number of pixels in the horizontal direction is increased, then the length X$_1$ of one bit in the horizontal shift register section 3 is reduced, which requires a fine pattern technique. Further, the transfer channel width W$_2$ of the vertical shift register 6 is reduced so that various problems such as the deterioration of transfer efficiency or the like occur.

In the horizontal type FIT solid state imaging element 16, if as shown in FIG. 7 the area of one pixel (one cell) a in the imaging section 1 is selected to be the same as that of FIG. 6, then a horizontal pitch (i.e., one bit length) P of the horizontal shift registers 18 in the storage section 2 can be increased so that a horizontal pitch (one bit length) X$_2$ of the horizontal shift register section 3 at the output section can also be increased. Thus, the solid state imaging element 16 can be made high in pixel density. However, when the horizontal pitch P of the horizontal shift registers 18 in the storage section 2 is selected to be long, then the chip size of the whole solid state imaging element becomes large and the ratio between the width W and the length L of the horizontal shift register 18 is reduced so that the transfer efficiency of the storage section 2 in the frame transfer (i.e., when the signal charge is transferred from the imaging section 1 to the storage section 2) is lowered.

On the other hand, when the horizontal pitch P in the storage section 2 is selected to be small, then the ratio between the width W and the length L in the frame transfer is increased. However, the ratio between the width W and the length L of the transfer channel during a so-called line transfer in which the signal charge is transferred from the imaging section 2 to the horizontal shift register section 3 is reduced (in an inverse proportion fashion) and hence the transfer efficiency is lowered. Further, when the density of pixels is increased, then the number of pixels in the horizontal direction is increased so that the frame transfer frequency in the storage section 2 and the horizontal transfer frequency in the horizontal shift register section 3 are increased, which requires greater electric power.

OBJECTS AND SUMMARY OF THE INVENTION

Accordingly, it is an object of the present invention to provide a solid state image sensor which can eliminate the disadvantages encountered with the prior art.

It is another object of the present invention to provide a solid state image sensor whose chip size can be reduced when a density of pixels is increased.

It is a further object of the present invention to provide a solid state image sensor in which the horizontal transfer frequency of a horizontal shift register section and the frame transfer frequency of a storage section can be lowered.

According to an aspect of the present invention, a charge coupled device image sensor is comprised of an imaging section including a plurality of photoelectric converting sections arrayed in a matrix configuration for generating signal charges and a plurality of horizontal shift registers arranged between the horizontal rows of the photoelectric converting sections for transferring the signal charges via a readout section in the horizontal direction, a storage section having a plurality of horizontal shift registers for transferring the signal charges in the horizontal direction and in the vertical direction line by line, a readout unit coupled to the storage section and including a plurality of horizontal shift registers for reading out signal charges from the storage section, and a serial-to-parallel converter provided between the imaging section and the storage section for storing one-line of signal charges from the imaging section into double-line of signal charges.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 10 is a plan view illustrating another embodiment of the present invention.

DESCRIPTION OF THE PREFERRED EMBODIMENT

Figure 1:
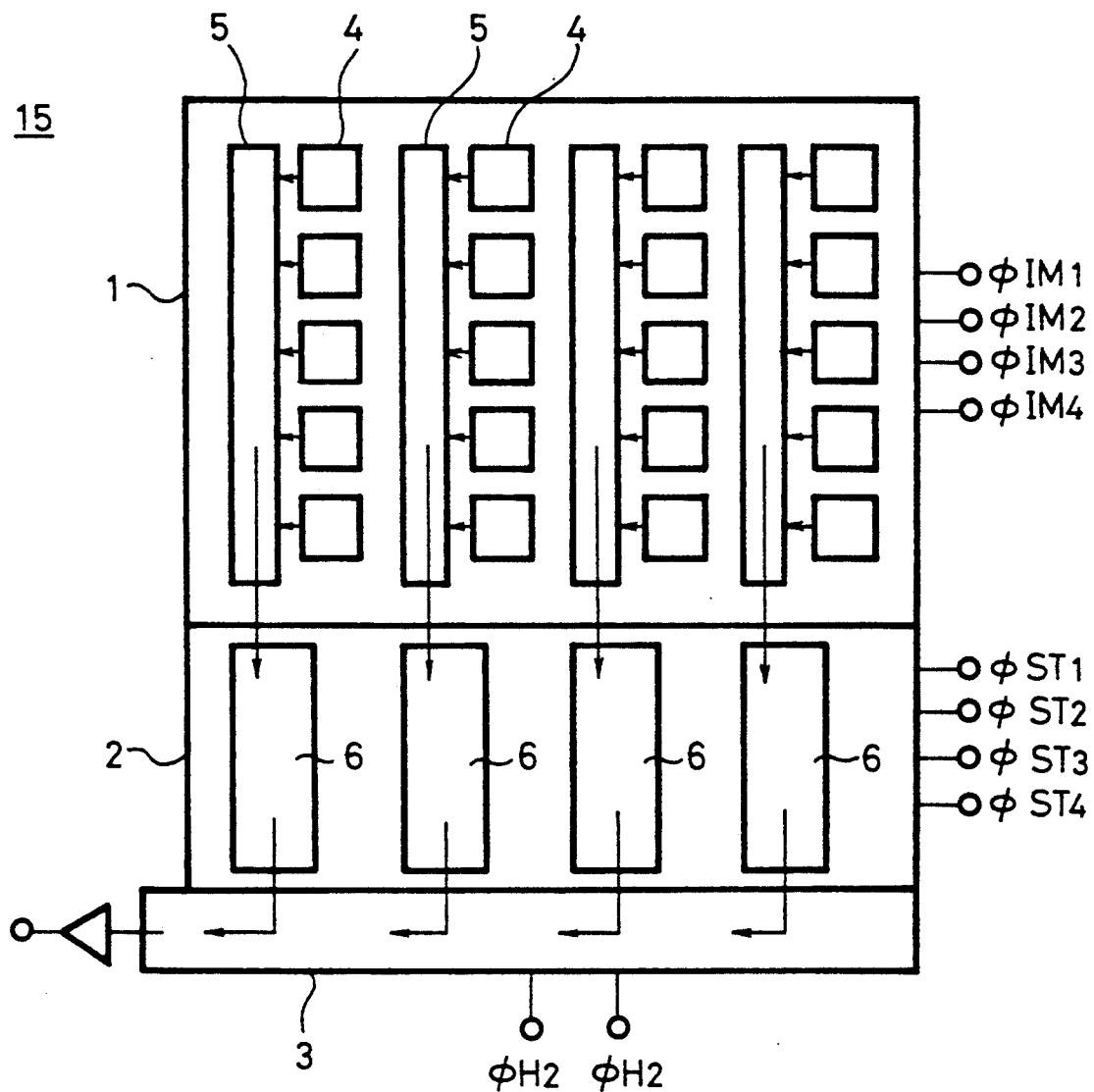
FIG. 1 is a plan view illustrative of a structure of an example of a conventional vertical type FIT solid state imager.
Figure 2:
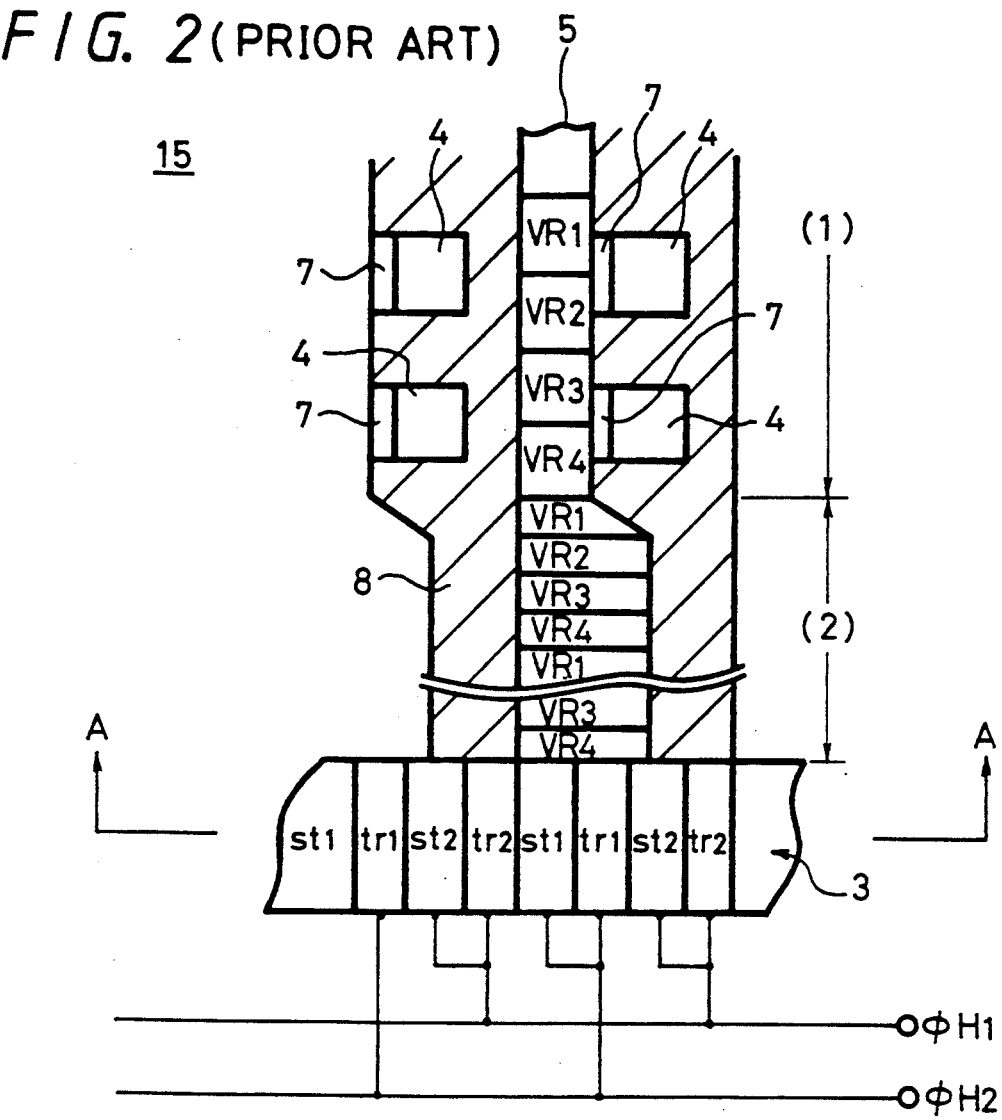
FIG. 2 is a plan view illustrative of a main portion of FIG. 1.
Figure 3:
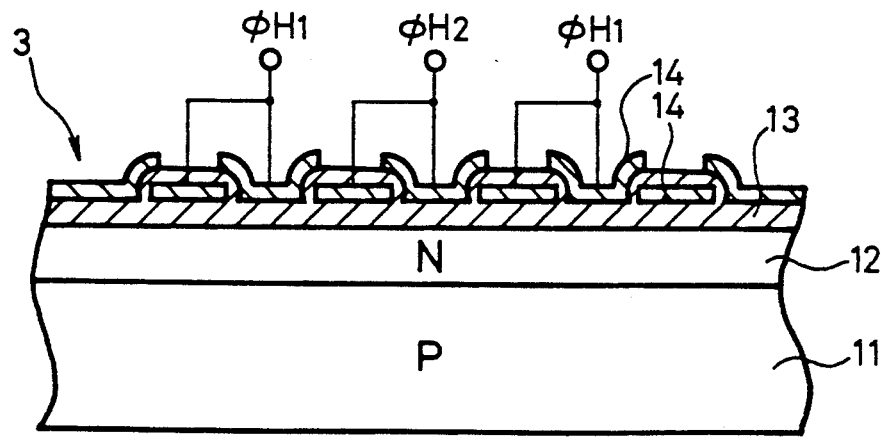
FIG. 3 is a cross-sectional view taken through the line A—A in FIG. 2.

An embodiment of a horizontal type FIT solid state image sensor 46 according to the present invention will be described with reference to FIGS. 8 and 9.

In the figures, reference numeral 31 denotes an imaging section, 32 a storage section which temporarily stores the signal charges from the imaging section 31 and is located at one side of the imaging section 31 in the horizontal direction, and 33 a horizontal shift register section of an output section which is located under the storage section 32. The image section 31 is formed of a number of imaging or light receiving elements 34 arrayed in a matrix configuration and a horizontal shift register 35 of a CCD structure located on one side of each of the rows of horizontally-arranged light receiving elements 34 for transferring the signal charges from the light receiving elements 34 to the storage section 32. A read-out gate (ROG) 37 is provided between each of the light receiving elements 34 and the horizontal shift register 35 for reading out the signal charge from each light receiving element 34 and transferring the same to the horizontal shift register 35. Each of the horizontal shift registers 35 employs, for example, a 3-phase drive system which is controlled by 3-phase drive pulses $\phi IM_1$, $\phi IM_2$, $\phi IM_3$ and in which three transfer sections VR ($VR_1$, $VR_2$, $VR_3$), each having a transfer electrode, are made as one bit and this one bit corresponds to each light receiving element 34.

In the storage section 32, a plurality of cells (i.e., two cells $b_1$, $b_2$ in this embodiment) corresponds to one pixel (one cell) a of the imaging section 31 in the vertical direction. Accordingly, in order that the light receiving elements 34 arranged in one horizontal line (row) of the imaging section 31 correspond with a plurality of horizontal shift registers, in this embodiment, two horizontal shift registers 38a, 38b, a plurality of the horizontal shift registers 38 are provided. Therefore, the number of cells of each horizontal shift register 38 in the horizontal direction is ½ of the number of light receiving elements 34 of each horizontal line in the imaging section 31 in the horizontal direction. The signal charges of one horizontal line in the imaging section 31 are stored through a serial-to-parallel converting section 40, which will be described later, in two horizontal shift registers 38a, 38b in a divided condition. That is, the signal charges at every other light receiving elements 34 of one horizontal line are stored in the first horizontal shift register 38a, while the signal charges at the remaining every other light receiving elements 34 of the same horizontal line are stored in the second horizontal shift register 38b.

Each of the horizontal shift registers 38 employs, for example, a 4-phase drive system which is controlled by 4-phase drive pulses $\phi ST_1$, $\phi ST_2$, $\phi ST_3$, $\phi ST_4$ and in which four transfer sections SR ($SR_1$, $SR_2$, $SR_3$, $SR_4$), each having a transfer electrode, are made as one bit. The adjacent horizontal shift registers 38 (38a, 38b) in the vertical direction are coupled through a gate section (i.e., a transfer channel $SR_5$ controlled by a gate electrode to which an independent gate voltage is applied) 39. This gate section 39 is formed between two transfer sections $SR_2$ and $SR_1$ forming a half bit of the upper horizontal shift register 38a and two transfer sections $SR_4$, $SR_3$ forming a half bit of the lower horizontal shift register 38b. Since the respective transfer sections $SR_1$, $SR_2$, $SR_3$, $SR_4$ of each horizontal shift register 38 are formed in correspondence with one another in the vertical direction, the gate section 39 is inclined so as to couple the transfer sections which are displaced by a half bit.

Figure 9:
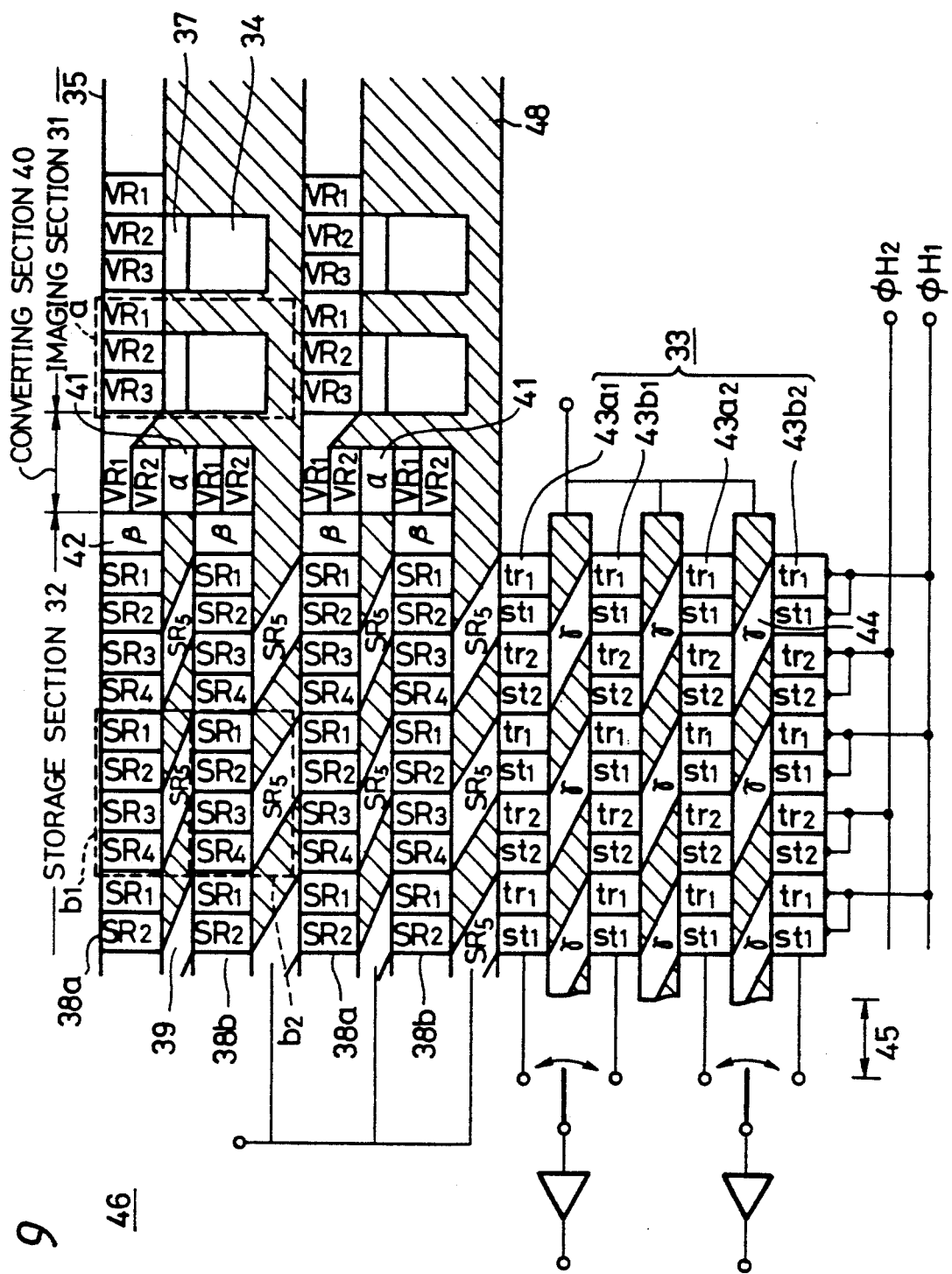
FIG. 9 is a plan view of a main portion of FIG. 8.

In the serial-to-parallel converting section 40, as shown in FIG. 9, transfer sections $VR_1$ and $VR_2$ are so provided in the vertical direction that they correspond to two horizontal shift registers 38a, 39b in the storage section 32, and a gate section (i.e., a transfer channel $\alpha$ controlled by a gate electrode to which an independent gate voltage is applied) is provided between the transfer section $VR_2$ which corresponds to the first horizontal shift register 38a and the transfer section $VR_1$ which corresponds to the second horizontal shift register 38b.

Further, the transfer section $VR_1$ corresponding to the first horizontal shift register 38a at the upper stage is coupled to the last stage of transfer section $VR_3$ of the horizontal shift register 35 in the imaging section 31. At the former stages of the first and second horizontal shift registers 38a, 38b in the storage section 32, which former stages contact with the serial-to-parallel converting section 40, gate sections $\beta$ are formed, respectively.

In the horizontal shift register section 33 of the output section, there are provided two sets of horizontal shift registers one set of which is formed of two horizontal shift registers 43a, 43b, that is, totally four horizontal shift registers 43 ($43_{a1}$, $43_{b1}$, $43_{a2}$, $43_{b2}$) in correspondence with the first and second horizontal shift registers 38a, 38b in the storage section 32.

Each of the four horizontal shift registers 43 employs a 2-phase drive system which is controlled by 2-phase drive pulses $\phi H_1$, $\phi H_2$ and in which four transfer sections, namely, a first storage section $st_1$, a first transfer section $tr_1$, a second storage section $st_2$ and a second transfer section $tr_2$ form one bit. In this case, the storage section $st_1$, the transfer section $tr_1$, the storage section $st_2$ and the transfer section $tr_2$ are so formed that they correspond to the transfer sections $SR_1$, $SR_2$, $SR_3$ and $SR_4$ in the storage section 32, respectively.

The adjacent horizontal shift registers 43 in the vertical direction are coupled by a gate section (i.e., a transfer channel $\gamma$ which is controlled by a gate electrode supplied with an independent gate voltage) 44. That is, the second storage section $st_2$ and the second transfer section $tr_2$ of the upper stage of horizontal shift register 43 are coupled to the first storage section $st_1$ and the first transfer section tr₁ of the lower stage of horizontal shift register 43 by the gate section 44.

At the last stage of the horizontal shift register section 33, there is provided a serial-to-parallel converting section 45 of an inverse conversion type relative to the serial-to-parallel converting section 40 to return the signal charges of each set of horizontal shift registers 43a, 43b to the signal charges of one horizontal line. In the illustrated embodiment, the above conversion is carried out by switching means. The transfer sections $SR_4$, $SR_3$ of the lowermost horizontal shift register 38 in the storage section 32 are coupled to the first storage section $st_1$ and the first transfer section $tr_1$ of the uppermost horizontal shift register 43 in the horizontal shift register section 33 through the gate section 39. In FIG. 9, a hatched area 48 is a channel stopper region.

Operation of the solid state image sensor 46 will be described below.

During the vertical blanking period, the signal charges from all the light receiving elements 34 of the imaging section 31 are transferred to the horizontal shift registers 35 through the read-out gate sections 37 (all pixels are read out), transferred through the horizontal shift registers 35 to the storage section 32 and then temporarily stored therein. At that time, the signal charges transferred through the horizontal shift registers 35 in the imaging section 31 are divided by the serial-to-parallel converting section 40 into the signal charges of every other light receiving elements (odd-numbered elements) 34 of one horizontal line and into the signal charges of remaining every other light receiving elements (even-numbered elements) 34 of the same horizontal line. By way of example, the signal charges of odd-numbered light receiving elements 34 are transferred through the gate section 41 to the lower stage transfer section $VR_2$, while the signal charges of the even-numbered light receiving elements 34 are transferred to the upper stage transfer section $VR_2$. Then, both signal charges are transferred at the same time through the gate sections 42 ($\beta$) to the corresponding horizontal shift registers 38a and 38b in the storage section 32, respectively. The above transfer of signal charges is repeated so that the signal charges are transferred to the storage section 32 in a so-called frame transfer fashion.

At the completion of the frame transfer of signal charges, the signal charges of the light receiving elements 34 on each horizontal line or row are distributed to the first and second horizontal shift registers 38a and 38b in the storage section 32. The signal charge of the odd-numbered light receiving elements 34 on the horizontal line are sequentially stored in the respective cells of the second horizontal shift registers 38b, while the signal charges of the even-numbered light receiving elements 34 on the same horizontal line are sequentially stored in the respective cells of the first horizontal shift register 38a. That is, as shown in FIG. 8, as to the signal charges $e_{11}$ to $e_{16}$ of one horizontal line, odd-numbered signal charges $e_{11}$, $e_{13}$, $e_{15}$ are stored in the second horizontal shift register 38b, while the even-numbered signal charges $e_{12}$, $e_{14}$, $e_{16}$ are stored in the first horizontal shift register 38a.

Then, at every horizontal blanking period, the signal charges of two horizontal lines are transferred from the storage section 32 to the horizontal shift register section 33 at the output section in a line transfer fashion in which the signal charges of the first and second horizontal shift registers 38a and 38b are taken as the signal charges of one horizontal line. In the storage section 32, the signal charges of the transfer sections $SR_2$, $SR_1$ are transferred to the transfer sections $SR_4$, $SR_3$ by a half bit in the horizontal direction and then transferred to the transfer sections $SR_2$, $SR_1$ of the lower stage horizontal shift register 38 through the transfer channel $SR_5$ of the gate section 39 in a zigzag fashion in the vertical direction. In the horizontal shift register 33, after the signal charge of the first storage section $st_1$ is transferred to the second storage section $st_2$ by a half bit in the horizontal direction, the signal charge is transferred through the transfer channel γ of the gate section 44 to the first storage section $st_1$ of the horizontal shift register 43 at the lower stage in a zigzag fashion in the vertical direction. As a result, in the storage section 32, the signal charges of the first and second horizontal shift registers 38a, 38b corresponding to one horizontal line (e.g., the even-numbered horizontal line) are transferred to the third and fourth horizontal shift registers $43_{a2}$, $43_{b2}$ in the output section. The signal charges of the first and second horizontal shift registers 38a and 38b corresponding to the next one horizontal line (e.g., the odd-numbered horizontal line) are transferred to the first and second horizontal shift registers $43_{a1}$ and $43_{b1}$ at the output section, respectively.

In the horizontal shift register section 33, the signal charges in the first to fourth horizontal shift registers $43_{a1}$ to $43_{b2}$ are transferred in the horizontal direction, and then from the first parallel-to-serial converting section 45, there are alternately delivered the signal charges of the first and second horizontal shift registers $43_{a1}$ and $43_{b1}$, while from the second parallel-to-serial converting section 45, there are alternately delivered the signal charges of the third and fourth horizontal shift registers $43_{a2}$ and $43_{b2}$. Thus, the signal charges of the odd- and even-numbered horizontal lines are simultaneously delivered in the order of the signal charges on one horizontal line in the imaging section 31. More specifically, as shown in FIG. 8, the signal charges are delivered from the one output in the order of $e_{11}$, $e_{12}$, ..., $e_{16}$, while from the other output in the order of $e_{21}$, $e_{22}$, ..., $e_{26}$, respectively.

According to the horizontal type FIT solid state image sensor 46 having the above-mentioned structure, one pixel (cell) a of the imaging section 31 corresponds to a plurality of cells arranged in the vertical direction in the storage section 32, or two cells b1 and b2 in this embodiment (see FIG. 9) and the serial-to-parallel converting section 40 is provided between the imaging section 31 and the storage section 32, whereby the signal charges on one horizontal line of imaging section 31 are stored in the two horizontal shift registers 38a and 38b in the divided state. Thus, the number of cells of the storage section 32 in the horizontal direction can be reduced to ½ of the number of cells of the prior-art horizontal FIT solid state image sensor 16 shown in FIG. 4. Therefore, since the total length of the storage section 32 in the horizontal direction can be reduced as compared with the prior-art example shown in FIG. 4, the total chip size of the solid state image sensor of the present invention can be reduced. Further, since the number of cells of the storage section 32 becomes ½, the length of each cell in the horizontal direction can be increased on the contrary, which means that the horizontal length of the cell of the horizontal shift register section 33 at the output section can be increased. As a result, the fine pattern technique for the transfer electrode and so on of the horizontal shift register section 33 and the storage section 32 can be avoided.

Figure 4:
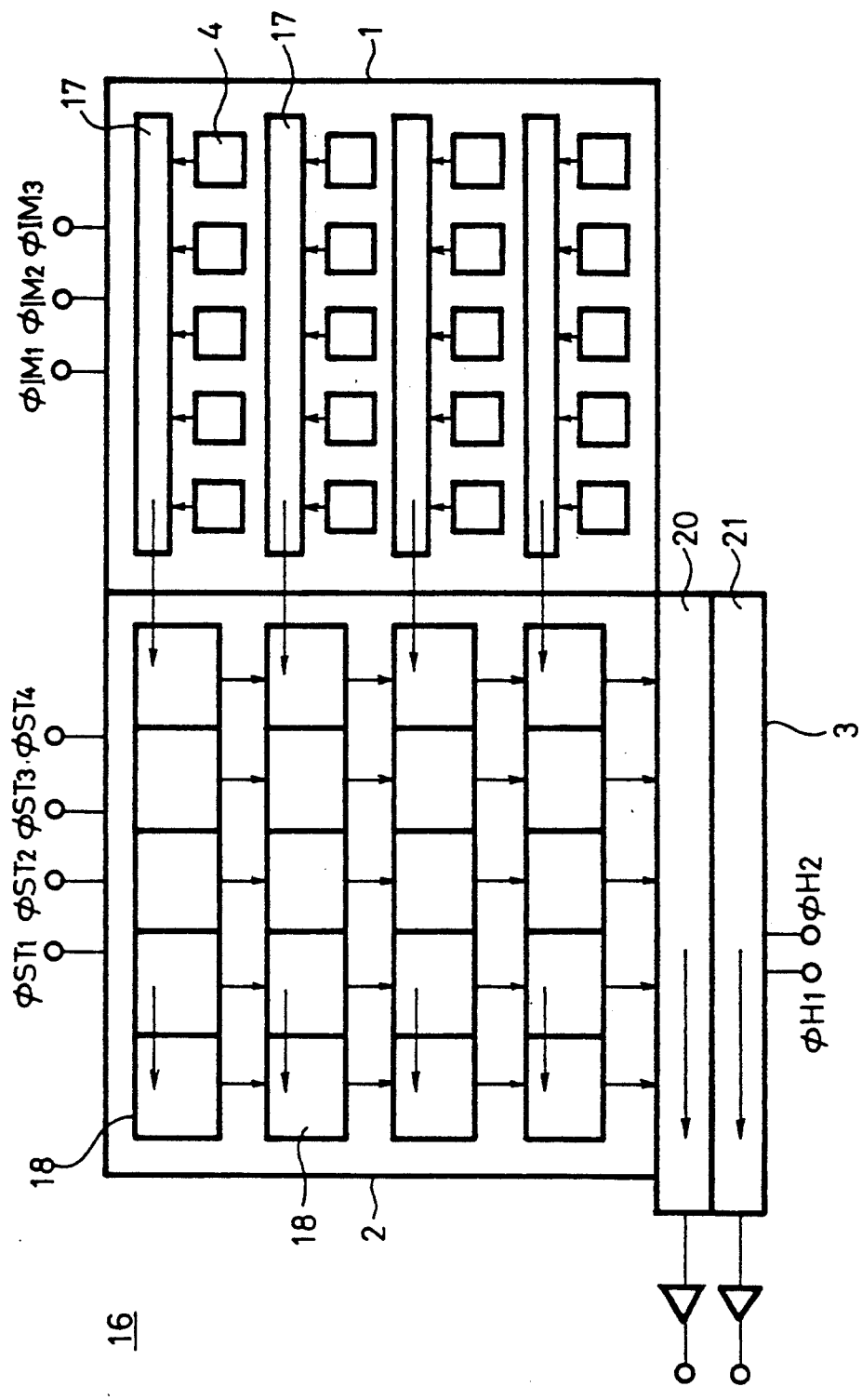
FIG. 4 is a plan view illustrative of a structure of an example of a conventional horizontal type FIT solid state image sensor.
Figure 5:
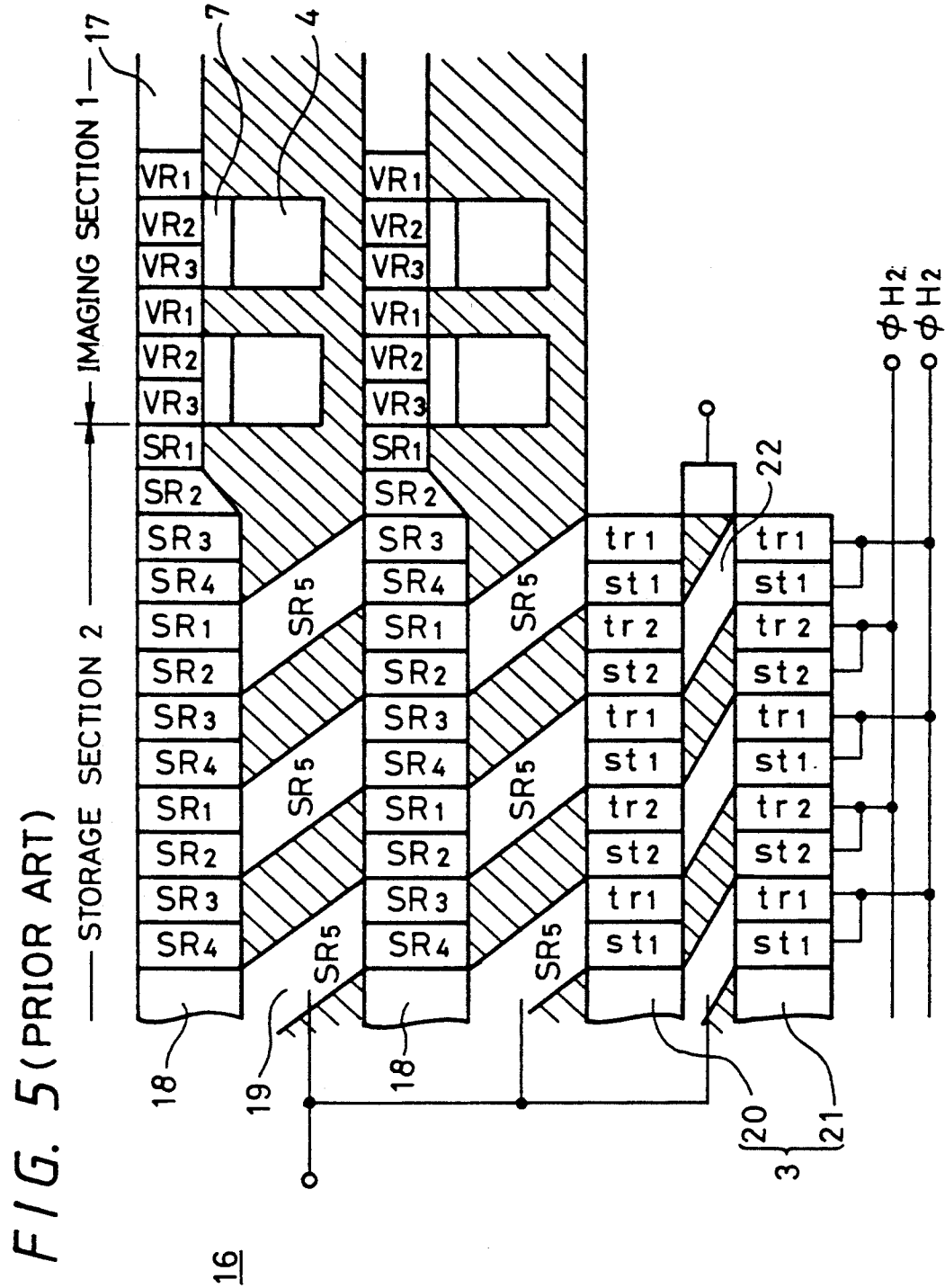
FIG. 5 is a plan view of a main portion of FIG. 4.
Figure 6:
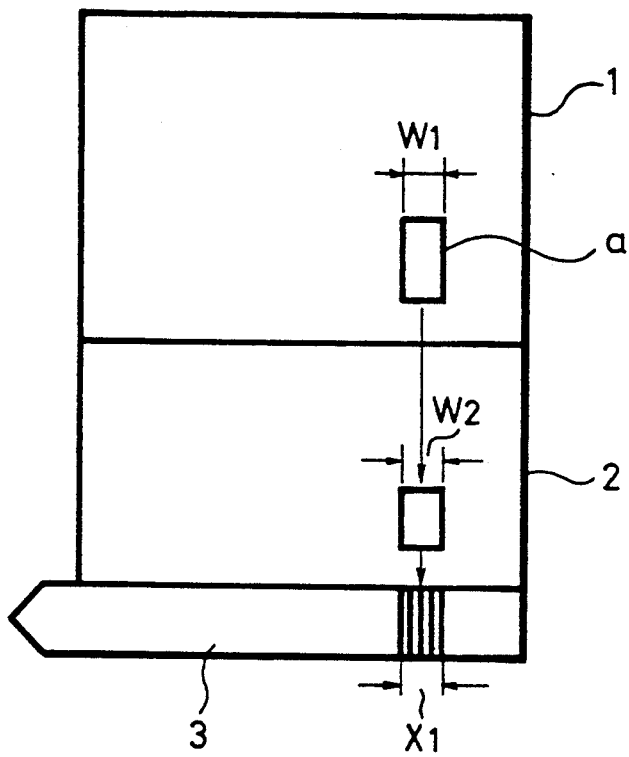
FIG. 6 is an explanatory diagram of FIG. 1.
Figure 7:
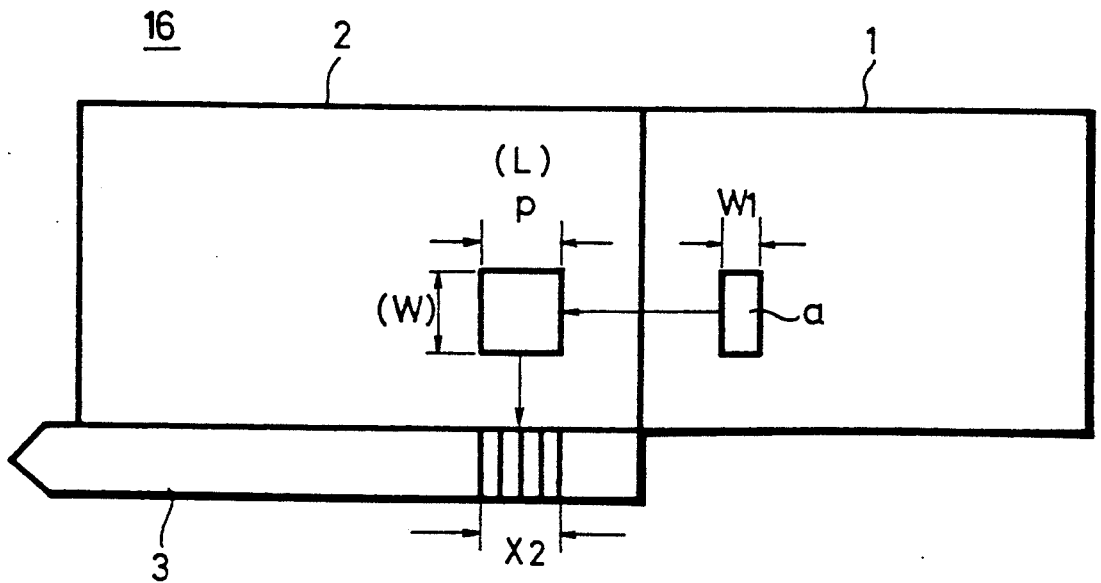
FIG. 7 is an explanatory diagram of FIG. 4.

Also, the ratio between the width W of the transfer section and its length L upon line transfer becomes twice as large as that of the prior-art example shown in FIG. 4, so that the transfer efficiency can be improved. Although the cell size of the storage section 32 in the horizontal direction is not dependent on the optical system, the freedom in its vertical direction is increased. Further, the horizontal transfer frequency in the horizontal shift register section 33 and the frame transfer frequency in the storage section 32 can be reduced to ½ of those of the prior-art example shown in FIG. 4. As a consequence, the transfer efficiency can be improved and also the amount of signal charges processed can be increased.

As set forth above, since the freedom of designing the storage section 32 and the horizontal shift register section 33 at the output section can be improved both in the horizontal and vertical directions, it is possible to obtain the optimum cell size of the storage section in view of the transfer efficiency, the amount of processed signal charges, the accuracy of the fine pattern technique and the chip size. Thus, the high pixel density can be promoted in this kind of solid state image sensor.

Figure 8:
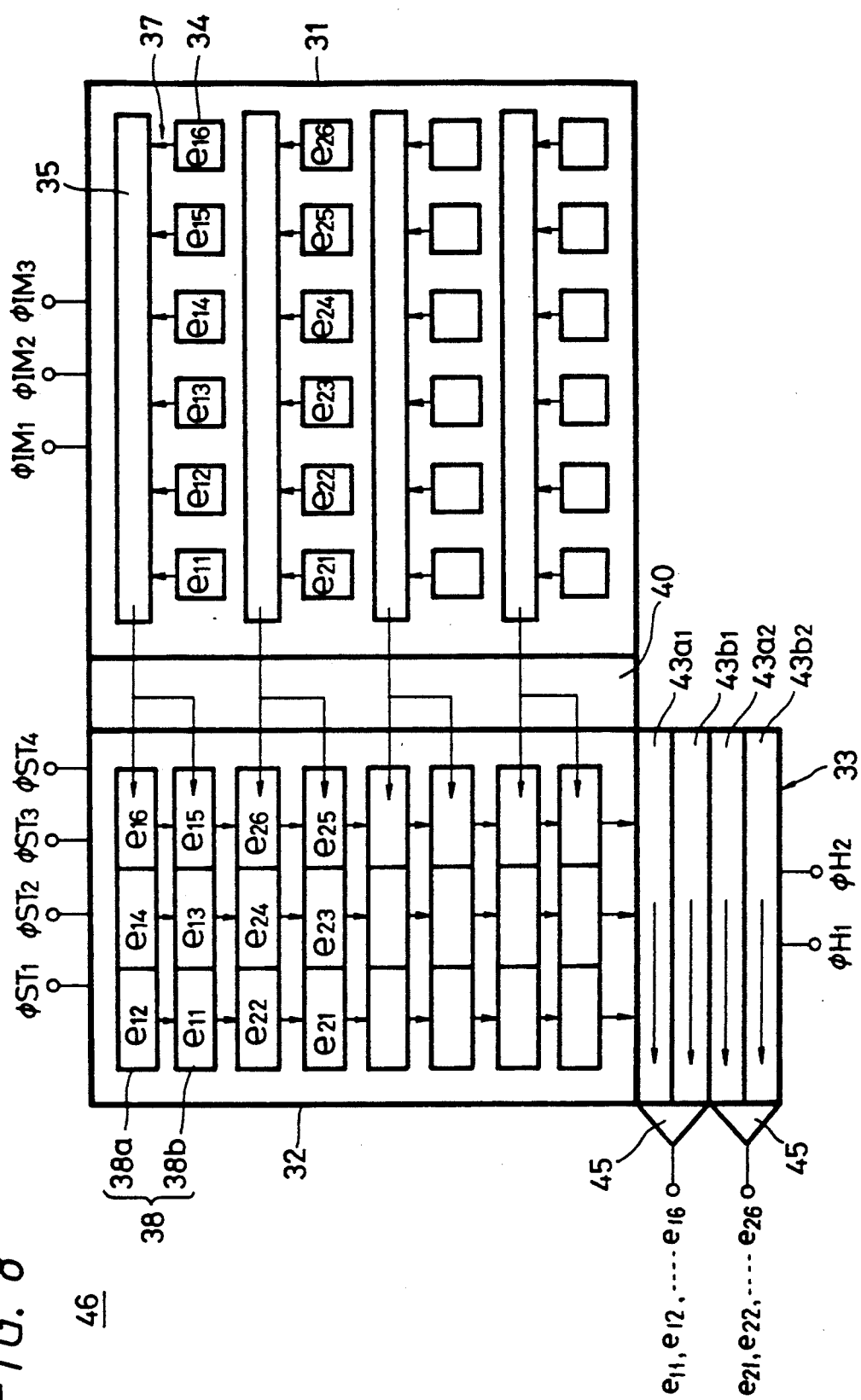
FIG. 8 is a plan view illustrative of a structure of an embodiment of a horizontal type FIT solid state image sensor according to the present invention.

In the embodiment of the present invention shown in FIGS. 8 and 9, although one storage section 32 is disposed at one side of the imaging section 31 in the horizontal direction, the storage section 32 may be provided at both sides imaging section 31. This example is shown in FIG. 10.

In this example, first and second storage sections 32A and 32B are located at both sides of the imaging section 31 in the horizontal direction, and first and second horizontal shift register sections 33A and 33B of the output section are respectively located beneath the first and second storage sections 32A and 32B. The imaging section 31 of this embodiment comprises the light receiving elements 34 the number of which is the same as that of the imaging section 31 shown in FIG. 8 and the horizontal shift registers 35 corresponding to respective horizontal rows of the light receiving elements 34 (in FIG. 10, for the sake of explanation the number of light receiving elements 34 on each horizontal row is 8)).

In this embodiment, the first storage section 32A comprises two cells in the vertical direction for one pixel (one cell) of the imaging section 31 and four horizontal shift registers 38 (38a, 38b, 38c, 38d) for each of odd-numbered horizontal lines in the imaging section 31. A first serial-to-parallel converting section 40A is provided between the first storage section 32A and the imaging section 31. The second storage section 32B comprises four horizontal shift registers 38 (38a, 38b, 38c, 38d) for each of even-numbered horizontal lines symmetrical with respect to the first storage section 32A and a second serial-to-parallel converting section 40B is provided between the second storage section 32B and the imaging section 31.

Each of the first and second horizontal shift register sections 33A and 33B at the output section has four horizontal shift register sections 43 (43a, 43b, 43c, 43d) corresponding to the four horizontal shift registers 38 of each of the first and second storage sections 32A and 32B and whose structure is similar to that shown in FIG. 9A. At the final stages of the horizontal shift register sections 33A, 33B, there are respectively provided parallel-to-serial converting sections (e.g., switching means similar to those of FIG. 9) 45A, 45B to return the signal charges from the horizontal shift register 43a through 43d to the signal charges of one horizontal line and then deliver the same.

In the imaging section 31, except for the fact that the averaging order of the transfer sections $VR_1$ to $VR_3$ of the horizontal shift registers 35 on the odd- and even-numbered horizontal lines are inverted to transfer the signal charges in the opposite directions, its remaining structure is substantially the same as that of the imaging section 31 shown in FIG. 9.

Even in the first and second storage sections 32A and 32B, the averaging order of the transfer sections $SR_1$ to $SR_4$ of each of the horizontal shift registers 38 is inverted to transfer the signal charges in the opposite directions in the horizontal direction and the remaining structure thereof is substantially the same as that of the storage section 32 shown in FIG. 9. In the serial-to-parallel converting sections 40A and 40A, which divide the signal charges of the light receiving elements 34 on one horizontal line in the imaging section 31 into four horizontal shift registers 38a to 38d of each of the storage sections 32A and 32B, the transfer sections $VR_1$, $VR_2$ are made as 1 cell and the cell number thereof is increased to 4 and the transfer sections $VR_1$, $VR_2$ are arranged so as to transfer the signal charges in the opposite directions vertically. The remaining structure thereof is substantially the same as that of serial-to-parallel converting section 40 shown in FIG. 9.

According to the horizontal FIT type solid state image sensor 47 arranged as above, during the vertical blanking period, the signal charges of the light receiving elements 34 of the odd-numbered horizontal lines in the imaging section 31 are read out to the horizontal shift register 35, transferred to the left-hand side horizontally as shown in FIG. 10 and then respectively transferred to the four horizontal shift registers 38a to 38d of the first storage section 32A through the serial-to-parallel converting section 40A in a divided form so as to be stored therein. The signal charges $e_{11}$ to $e_{18}$ of the odd-numbered horizontal lines, for example, are stored in the first to fourth horizontal shift registers 38a to 38d as shown in FIG. 10. Simultaneously, the signal charges of the light receiving elements on the even-numbered horizontal lines in the imaging section 31 are read out to the horizontal shift register 35, horizontally transferred to the right-hand side of FIG. 10, respectively transferred through the second serial-to-parallel converting section 40B to the corresponding four horizontal shift registers 39a to 38d of the second storage section 32B in a divided form and then stored therein. The signal charges $e_{21}$ to $e_{28}$ of the even-numbered horizontal lines, for example, are respectively stored in the first to fourth horizontal shift registers 38a to 38d as shown in FIG. 10.

Next, during the horizontal blanking period, the signal charges of the four horizontal shift registers 38a to 38d of the respective storage sections 32A and 32B are respectively transferred to the four horizontal shift registers 43a to 43d of the first and second horizontal shift register sections 33A and 33B. Then, the signal charges are simultaneously transferred within the respective horizontal shift registers 43a to 43d, alternately outputted from the parallel-to-serial converting sections 45A and 45B, outputted from the first horizontal shift register section 33A in the order of the signal charges on the odd-numbered horizontal lines in the imaging section 31 and then simultaneously outputted from the second horizontal shift register section 33B in the order of the signal charges on the even-numbered horizontal shift register. More specifically, the first horizontal shift register section 33A outputs the signal charges $e_{11}$ to $e_{18}$ of the odd-numbered lines and the second horizontal shift register section 33B outputs the signal charges $e_{21}$ to $e_{28}$ of the even-numbered lines, respectively.

According to the horizontal FIT type solid state image sensor element 47 thus arranged, the horizontal transfer frequencies of the horizontal shift register sections 33A, 33B and the frame transfer frequencies of the storage sections 32A, 32B are lowered to ½ as compared with those of the solid state imaging element 46 of FIG. 8, accordingly, ¼ as compared with those of the conventional solid state image pickup element of FIG. 4, thereby the transfer efficiency being increased and the amount of signal charges to be treated being increased. Further, since the storage sections 32A and 32B are symmetrically provided with respect to the imaging section 31, the center of the chip constructing the solid state image sensor element can be made closer to the optical center.

While the two horizontal shift registers 38a, 38b are provided in the storage section 32 for the light receiving element of one horizontal line so as to allow the two cells to vertically correspond to one pixel (one cell) of the imaging section 31 as shown in FIG. 8, a plurality of horizontal shift registers, for example, more than two horizontal shift registers are provided in one pixel (one cell) in a divided form such that a plurality of cells, for example, more than two cells correspond vertically to one pixel (one cell). Simultaneously, the horizontal shift registers the number of which corresponds to the number of the divided horizontal shift registers are provided in the horizontal shift register section 33. According to the above-mentioned arrangement, the width W/lenght L of the transfer section upon line transfer is increased to become several times the divided number of more than 2 and the horizontal transfer frequency of the horizontal shift register section and the frame transfer frequency of the storage section can be reduced to 1/divided number as compared with those of the prior art. Furthermore, if the similar divided number is provided in FIG. 10, then the horizontal transfer frequency and the frame transfer frequency are reduced to 1/(divided number×2) as compared with those of FIG. 8.

According to the solid state image sensor of the present invention, the fine pattern technique of the horizontal shift register section in the output section, the transfer electrodes of the storage section or the like are not needed and the entire chip size constructing the solid state image sensor can be reduced. Also, the transfer efficiency upon line transfer can be increased. Further, the horizontal transfer frequency of the horizontal shift register section and the frame transfer frequency of the storage section can be reduced. Furthermore, the transfer efficiency can be increased and the amount of signal charges to be processed can be optimized. In addition, the cell size of the storage section in the horizontal and vertical directions can be increased in freedom and the design of the same can be optimized with ease. Therefore, the density of pixels in the solid state image sensor can be increased more.

Having described the preferred embodiment of the invention with reference to the accompanying drawings it is to be understood that the invention is not limited to that precise embodiment and various changes and modifications thereof could be effected by one skilled in the art without departing from the spirit or scope of the invention as defined in the appended claims.

What is claimed is:

1. A charge coupled device image sensor, comprising:
    (a) an imaging section including a plurality of photoelectric converting sections arrayed in a matrix configuration for generating signal charges and a plurality of horizontal shift registers arranged between horizontal rows of the photoelectric converting sections for transferring the signal charges via a readout section in the horizontal direction;
    (b) a storage section having a plurality of horizontal shift registers for each of said horizontal shift registers in said image section for transferring the signal chargers in the horizontal direction and in zigzag fashion in the vertical direction line by line;
    (c) readout means coupled to said storage section and including first and second sets of horizontal shift registers for reading out signal charges from said storage section, said first set of horizontal shift registers storing signal charges of odd lines of said photoelectric converting sections, said second set of horizontal shift registers storing signal charges of even lines of said photoelectric converting sections; and
    (d) serial-to-parallel converting means provided between said imaging section and said storage section for converting one line of signal charges from said imaging section into a plurality of lines of signal charges, said serial-to-parallel converting means including:
    a pair of transfer sections coupled to each output of the plurality of said horizontal shift registers of said image section and a channel provided between the pair of said transfer sections and a first gate controlling said channel; and
    a second gate provided between each input side of the plurality of horizontal shift registers of said storage section and said pair of said transfer sections.

2. A charge coupled device image sensor according to claim 1, in which said storage section is divided into two portions and said two portions are provided at both sides of said imaging section.

3. A charge coupled device image sensor as claimed in claim 1, wherein said plurality of lines of said serial to parallel converting section is four lines.

4. A solid state image sensor, comprising:
    an imaging section including
        a plurality of light receiving elements for converting light to signal charges and arranged in a matrix of rows and columns,
        a plurality of horizontal shift registers arranged between rows of said light receiving elements for receiving signal charges from said light receiving elements and transferring said signal charges horizontally;
    a serial to parallel converting section connected to said plurality of horizontal
        shift registers of said imaging section for transferring each series of signal charges from said horizontal shift registers to a plurality of storage registers, said serial to parallel converting section including a plurality of transfer sections connected to outputs of said horizontal
        shift registers of said imaging section, a first gate connected between said plurality of transfer sections, a second gate connected between each of said transfer sections and the storage registers;

a storage section including
 a plurality of horizontal shift registers for each horizontal register of said imaging section, said horizontal shift registers of said storage section being connected to said second gates of said serial to parallel converting section to receive signal charges of every n light receiving elements, where n is the number of transfer sections in said serial to parallel converting section for each horizontal shift register of said imaging section, said plurality of horizontal shift registers being connected to one another to transfer signal charges vertically and simultaneously by half bit shifts in a horizontal direction so that signal charges are transferred in zigzag fashion; and an output section including
 a plurality of horizontal shift registers connected to receive signal charges from said storage section and output said signal charges.

5. A solid state image sensor as claimed in claim 4, wherein n is 4.

* * * * *